US011905850B2

(12) United States Patent
Hartung et al.

(10) Patent No.: US 11,905,850 B2
(45) Date of Patent: Feb. 20, 2024

(54) ARRANGEMENT FOR REDUCING OSCILLATION

(71) Applicant: MTU Aero Engines AG, Munich (DE)

(72) Inventors: Andreas Hartung, Munich (DE); Hans-Peter Hackenberg, Munich (DE); Malte Krack, Stuttgart (DE); Timo Theurich, Stuttgart (DE)

(73) Assignee: MTU AERO ENGINES AG, Munich (DE)

(*) Notice: Subject to any disclaimer, the term of this patent is extended or adjusted under 35 U.S.C. 154(b) by 90 days.

(21) Appl. No.: 17/743,479

(22) Filed: May 13, 2022

(65) Prior Publication Data
US 2022/0381147 A1 Dec. 1, 2022

(30) Foreign Application Priority Data
May 20, 2021 (DE) .................... 102021113164.2

(51) Int. Cl.
F01D 5/26 (2006.01)
F01D 5/16 (2006.01)
F16F 15/14 (2006.01)

(52) U.S. Cl.
CPC ................ F01D 5/26 (2013.01); F01D 5/16 (2013.01); F16F 15/14 (2013.01); F05D 2260/96 (2013.01); F16F 2230/0029 (2013.01)

(58) Field of Classification Search
CPC . F01D 25/04; F01D 25/06; F01D 5/10; F01D 5/16; F01D 5/26; F16F 15/02; F16F 15/14
See application file for complete search history.

(56) References Cited

U.S. PATENT DOCUMENTS 5,232,344 A 8/1993 El-Aini
5,634,189 A 5/1997 Rossmann et al.
(Continued)

FOREIGN PATENT DOCUMENTS

DE 19957718 C1 6/2001
DE 60107891 T2 12/2005
(Continued)

OTHER PUBLICATIONS

Pastorius, Walter J., "Damping factors in turbine blade vibration," Electronic Theses and Dissertations, Jul. 1969, pp. 1-101, University of Windsor, ProQuest Information and Learning Company, Ann Arbor, Michigan, USA.
A. Hartung et al., "More Flexible Damping Systems for Blades and Vanes," Technische Mechanik, Jun. 2017, pp. 258-267, vol. 37 No. 2-5, Magdeburger Verein für Technische Mechanik e.V., Magdeburg, Germany.
(Continued)

Primary Examiner — Woody A Lee, Jr.
Assistant Examiner — Cameron A Corday
(74) Attorney, Agent, or Firm — LEYDIG, VOIT & MAYER, LTD.

(57) ABSTRACT

An arrangement reduces oscillation (vibration) of an oscillatory structure. The arrangement has a structure having at least one mode in at least one direction; and an oscillation-reducing device (vibration-reducing device). The oscillation-reducing devices has a housing formed by or provided on the structure, a cavity, and a body configured for making impact contacts with the housing and disposed in the cavity in such a manner that the body is configured to make impact contacts with the housing at least temporarily for as long as the structure is excited in the at least one mode in the at least on direction.

12 Claims, 3 Drawing Sheets

(56) References Cited

U.S. PATENT DOCUMENTS

| | | | |
|---|---|---|---|
| 5,827,047 A | 10/1998 | Gonsor et al. | |
| 6,827,551 B1 * | 12/2004 | Duffy | F01D 5/16 |
| | | | 416/500 |
| 2001/0002235 A1 | 5/2001 | Huebner | |
| 2001/0026039 A1 | 10/2001 | Hasegawa et al. | |
| 2007/0221460 A1 | 9/2007 | Guo et al. | |
| 2012/0024646 A1 | 2/2012 | Tsugihashi et al. | |
| 2016/0146041 A1 * | 5/2016 | Hartung | F01D 25/06 |
| | | | 416/190 |
| 2017/0335695 A1 * | 11/2017 | Schlemmer | F01D 5/147 |
| 2020/0190986 A1 | 6/2020 | Richter et al. | |
| 2020/0240277 A1 | 7/2020 | Hartung et al. | |
| 2021/0317744 A1 | 10/2021 | Watanabe et al. | |
| 2022/0373060 A1 * | 11/2022 | Hartung | F01D 5/26 |

FOREIGN PATENT DOCUMENTS

| | | |
|---|---|---|
| DE | 69736570 T2 | 9/2007 |
| DE | 102007000147 A1 | 10/2007 |
| DE | 102018221668 A1 | 6/2020 |
| EP | 1980715 A1 | 10/2008 |
| EP | 3667020 A1 | 6/2020 |
| WO | WO 0057641 A1 | 9/2000 |
| WO | 2020090169 A1 | 5/2020 |

OTHER PUBLICATIONS

A. Hartung et al., "Impulse Mistuning of Blades and Vanes," Journal of Engineering for Gas Turbines and Power, Jul. 2017, pp. 1-9, American Society of Mechanical Engineers, New York, NY, USA.

* cited by examiner

ARRANGEMENT FOR REDUCING OSCILLATION

CROSS REFERENCE TO RELATED APPLICATIONS

This application claims benefit to German Patent Application No. DE 102021113164.2, filed on May 20, 2021, which is hereby incorporated by reference herein.

FIELD

The present disclosure relates to an arrangement for reducing vibration.

BACKGROUND

In many technical fields, some of which are completely different, there are oscillatory structures whose oscillations (vibration), in particular the amplitudes of the modes or natural frequencies of oscillation of the structures, are reduced by known oscillation-reducing measures, such as frictional damping, attachment of additional weights, use of amplitude limiters, use of rheological fluids, use of active damping systems (e.g., piezo dampers), or by coupling to additional spring-mass systems. Oscillation reduction (vibration reduction) can be advantageous, for example, to extend the life of the structure, to reduce noise emitted by the structure, and/or to reduce the risk of impairment of the function of the structure.

Examples of such oscillatory structures are parts, portions and components of motors (e.g., electric motors and/or internal combustion engines), in particular of automotive engines or marine engines, of turbines, of manufacturing machines (e.g., for milling and/or turning), of engines, in particular aircraft engines, of propulsion systems (e.g., rocket propulsion systems), of constructions (e.g., buildings or bridges), of vehicles, in particular automobiles, of aircraft, of rockets, of satellites, of any means of transportation, or parts, portions and/or components in contact therewith.

SUMMARY

In an embodiment, the present disclosure provides an arrangement for reducing oscillation of an oscillatory structure. The arrangement includes: a structure having at least one mode in at least one direction; and at least one oscillation-reducing device. The oscillation-reducing device has at least one housing formed by or provided on the structure, a cavity, and at least one body. The body is configured for making impact contacts with the housing and disposed in the at least one cavity in such a manner that the body is configured to make impact contacts with the housing at least temporarily for as long as the structure is excited in the at least one mode in the at least on direction. For a clearance for movement B of the at least one body in the at least one direction in the at least one cavity, it holds that: $0.1 \times A\_0j < B < 0.95 \times A\_0j$; and/or for a mass mi of the at least one body, it holds that: $m\_i < \mu \times M\_{jj}$, with $\mu = a/(A1j/A0j)^2$, and $0.000001 < a < 0.0009$. A0j is an oscillation amplitude in the at least one mode without an oscillation-reducing device at a position at which the oscillation-reducing device is to be provided, during normal intended use of the structure. Mjj is a modal mass of the structure in the at least one mode. A1j is a maximum oscillation amplitude in the at least one mode during the normal intended use of the structure with the oscillation-reducing device at the position at which the oscillation-reducing device is to be provided.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
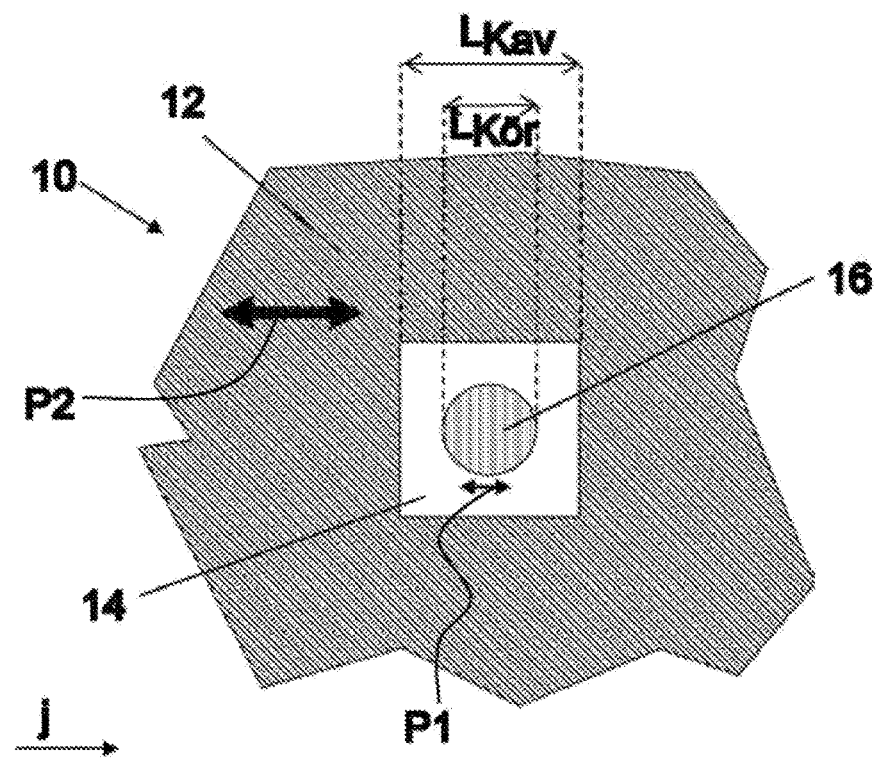
FIG. 1 shows an arrangement according to an aspect of the present disclosure.

Aspects of the present disclosure provide an improved technique of oscillation reduction (vibration reduction).

In accordance with an aspect of the present disclosure, an arrangement for reducing oscillation of an oscillatory structure includes:

a structure having at least one mode in at least one direction, and at least one oscillation-reducing device including at least one housing formed by or provided on the structure and having a cavity, in particular a closed cavity, and further including at least one body for making impact contacts with the housing and disposed in the at least one cavity in such a manner that it makes impact contacts with the housing at least temporarily, in particularly continuously, for as long as the structure is excited in the at least one mode in the at least one direction (by external excitation, self-excitation and/or parameter excitation and/or by initial conditions), wherein a) for a clearance for movement B of the at least one body in the at least one direction in the at least one cavity, it holds that $$0.1 \times A_{0j} < B < 0.95 \times A_{0j},$$

and/or b) for a mass $m_i$ of the at least one body, it holds that $$m_i < \mu \times M_{jj}, \text{ with } \mu = \frac{a}{\left(\frac{A1j}{A0j}\right)^2}, \text{ and } 0.000001 < a < 0.0009,$$

where $A_{0j}$ is an oscillation amplitude in the at least one mode without an oscillation-reducing device at a position at which the oscillation-reducing device is to be provided, during normal intended use of the structure, where Mjj is a modal mass of the structure in the at least one mode, and $A_{1j}$ indicates a maximum oscillation amplitude in the at least one mode during normal intended use of the structure with the oscillation-reducing device at the position at which the oscillation-reducing device is to be provided.

The at least one mode of the structure is an oscillation, in particular a natural frequency of oscillation, in which the structure can oscillate and/or be excited. Furthermore, the modal mass of the structure in the at least one mode is a mass of the structure which mass oscillates, moves and/or is excited to oscillate in the respective mode.

In an embodiment, oscillations of the structure, such as vibrations, can be particularly effectively avoided or at least reduced, preferably at least significantly reduced, by the continuous, impact-based momentum exchange, in particular by means of substantially elastic impacts. In particular, in an embodiment, the oscillation amplitudes of the structure can be significantly reduced with a comparatively small total mass of the at least one body without at the same time requiring the body or bodies to be positioned at the location of maximum mode amplitude, which, depending on the design of the particular structure (e.g., a bridge), may be impossible or difficult to achieve because of geometric or structural limitations.

In an embodiment, since the momentum exchange between the structure and the at least one body via the housing; i.e., between the structure and one or more bodies via the housing in whose cavity the at least one body is disposed, can be effected by substantially elastic impacts, in particular with an energy dissipation (e.g., by friction) per oscillation period of no more than 20%, preferably no more than 10%, in particular no more than 5% relative to the kinetic energy associated with the oscillation, oscillations of the structure can be particularly effectively reduced with only small additional masses of the body or bodies.

In some embodiments, the oscillation-reducing device has a plurality of the in particular closed cavities described, and a plurality of the bodies described. The present description of "at least one" cavity and "at least one" body may apply accordingly to each cavity and each body of the oscillation-reducing device.

In some embodiments, the number of cavities and/or bodies is, for example, 1, 2, 3, 4, 5, 10, 20, 100, 150, 200 or more, or is in a range of from 1 to 300, 1 to 200, 1 to 150, 1 to 100, 1 to 50, 1 to 30, 2 to 10, or 5 to 30.

Preferably, the majority of the cavities or each cavity of the oscillation-reducing device have/has only one (i.e., exactly one) body disposed therein.

The substantially elastic impacts may occur between metallic and/or ceramic contact or impact surfaces of the respective body and the respective cavity or housing. In an embodiment, by providing the oscillation-reducing device, a maximum oscillation amplitude in the at least one mode is reduced by at least 5%, 20%, 30%, 40% or 50% compared to the oscillation amplitude in the at least one mode without an oscillation-reducing device at the position at which the oscillation-reducing device is to be provided, during normal intended use of the structure.

In an embodiment, the structure is a rotor blade or a stator vane of a turbine or compressor stage of a turbomachine, in particular of an aircraft engine, a part or a portion thereof, a part or a portion of a motor, in particular of an electric motor and/or an internal combustion engine, in particular of an automotive engine or a marine engine, of a turbine, of a manufacturing machine, in particular for milling and/or turning, of an engine, in particular of an aircraft engine, of a propulsion system, e.g., of a rocket propulsion system, of a construction, in particular of a building or a bridge, of a vehicle, in particular of an automobile, of an aircraft, of a rocket, of a satellite, or of any means of transportation, a part in contact therewith, or a portion in contact therewith.

In an embodiment, the total mass of the at least one body, in particular of all bodies of the oscillation-reducing device taken together, is at least 100 times, preferably at least 1000 times, in particular at least 10000 times smaller than the structure's modal mass that oscillates in the respective mode and/or the modal mass oscillating in the respective mode is no more than 200000 times, preferably no more than 100000 times, in particular no more than 50000 times greater than the total mass of the at least one body. There is an embodiment of the present disclosure for each combination of these upper and lower limits.

In an embodiment, the at least one oscillation-reducing device is disposed on the structure only in those regions where the oscillation amplitude in the at least one mode without an oscillation-reducing device in the respective region is at least 0.1%, preferably at least 1% and/or no more than 100%, 50%, 20%, 10%, 5%, 1%, 0.5%, 0.2% of the maximum oscillation amplitude in the at least one mode without an oscillation-reducing device in the respective region. There is an embodiment of the present disclosure for each combination of these upper and lower limits.

In an embodiment, the at least one body includes an ellipsoid, in particular a sphere, a cylinder and/or a cuboid.

In an embodiment, the clearance for movement of at least one of the at least one body, in particular of all of the bodies, in at least one direction, in particular in all directions, is no more than 2 times, preferably no more than 1 times, in particular no more than 0.5 times an in particular maximum cross-sectional dimension of the body and/or at least 0.05 times, preferably at least 0.1 times, in particular at least 0.2 times an in particular maximum cross-sectional dimension of the body. There is an embodiment of the present disclosure for each combination of these upper and lower limits.

In an embodiment, the structure is a turbine blade having a blade root, a connecting piece for connection to an airfoil, an upper shroud disposed on the connecting piece, and a lower shroud connecting the blade root and the connecting piece, the at least one oscillation-reducing device being provided in or on the lower shroud and/or in or on the upper shroud and/or in or on the connecting piece.

In an embodiment, the at least one body, in particular all bodies or the majority of all bodies, has/have a metallic or ceramic surface, and the at least one cavity, in particular all cavities, is/are bounded by metallic or ceramic surfaces, so that the impact contacts occur between metal and metal, between ceramic and ceramic, or between metal and ceramic, or the body or bodies is/are disposed in the respective cavity so as to make such, in particular substantially elastic, impact contacts. FIG. 1 shows an arrangement 10 according to an embodiment of the present disclosure.

Arrangement 10 includes an oscillatory structure 12, and an oscillation-reducing device intended to at least reduce oscillation of structure 12.

The oscillation-reducing device includes a housing having a cavity 14, in the embodiment shown a closed cavity 14, which housing is formed by structure 12 and encloses or defines cavity 14, and further includes a body 16 which, for example, may include a metal or a ceramic or may be made of metal or ceramic, and which is disposed in cavity 14 in such a way that it can freely move with play in at least one direction j, as illustrated by the double-headed arrow P1 shown in cavity 14.

In the embodiment shown in FIG. 1, body is 16 spherical and cavity 14 is cuboid-shaped. In other embodiments, body 16 may also have the shape of an ellipse, a cylinder and/or a cuboid, and cavity 14 may be cylindrical in configuration.

Furthermore, in other embodiments, the arrangement may include a plurality of housings, each of which is formed by structure 12 or is attached or connected to structure 12, and each of which encloses or defines a cavity 14 having at least one body 16 disposed therein. The individual cavities 14 and the respective bodies 16 may be configured such that the bodies 16 disposed in different cavities 14 can freely move with play in different directions.

Structure 12 may be at least a part or portion of a motor, in particular of an electric motor and/or an internal combustion engine, in particular of an automotive engine or a marine engine, of a turbine, of a manufacturing machine, in particular for milling and/or turning, of an engine, in particular of an aircraft engine, of a propulsion system, e.g., of a rocket propulsion system, of a construction, in particular of a building or a bridge, of a vehicle, in particular of an automobile, of an aircraft, of a rocket, of a satellite, or of any means of transportation, a part in contact therewith, or a portion in contact therewith.

Structure 12 has at least one mode or mode of oscillation or natural frequency of oscillation in which structure 12 can be excited to oscillate or vibrate during normal intended use. In the embodiment shown in FIG. 1, structure 12, when excited in the at least one mode, oscillates back and forth along direction j, as illustrated by the bold double-headed arrow P2 shown on structure 12.

Body 16 is disposed in cavity 14 so as to make impact contacts with the housing formed by structure 12 and having the cavity 14, and in such a manner that it makes impact contacts with the housing, and thus with structure 12, at least temporarily, in one embodiment continuously, for as long as structure 12 is excited in the at least one mode, as a result of which a maximum oscillation amplitude in the mode is reduced by at least 50% compared to a case where no oscillation-reducing device is provided.

The clearance for movement B of body 16 in cavity 14, in particular while making the impact contacts with the housing, is defined by a length $L_{Kav}$ of cavity 14 in the direction of movement j minus the length $L_{Kör}$ of body 16 in the direction of movement j.

In an embodiment, the clearance for movement B of body 16 may be selected such that the following equation is satisfied:

$$0.1 \times A_{0j} < B < 0.95 \times A_{0j},$$

Additionally or alternatively, a mass $m_i$ of the at least one body 16 may be selected such that the following relation is satisfied:

$$m_i < \mu \times M_{jj}, \text{ with } \mu = \frac{a}{\left(\frac{A1j}{A0j}\right)^2}, \text{ and } 0.000001 < a < 0.0009,$$

where:

$A_{0j}$ is an oscillation amplitude in the at least one mode without an oscillation-reducing device at a position at which the oscillation-reducing device is to be provided, during normal intended use of structure 12, Mjj is a modal mass of structure 12 in the at least one mode, and $A_{1j}$ is a maximum oscillation amplitude in the at least one mode during normal intended use of structure 12 with the oscillation-reducing device at the position at which the oscillation-reducing device is to be provided.

Figure 2:
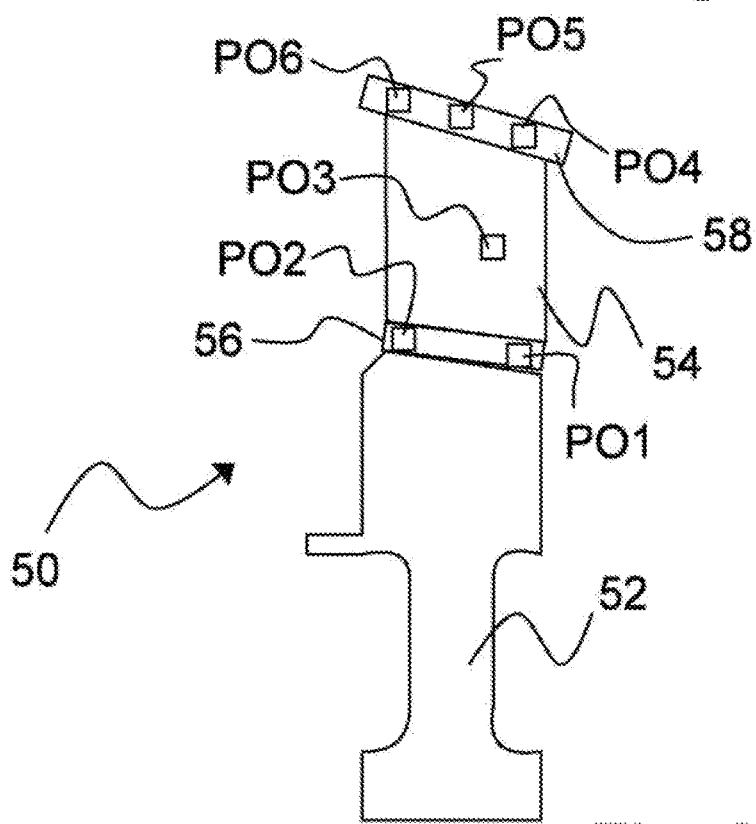
FIG. 2 shows possible positions of an oscillation-reducing device on a turbine blade.

FIG. 2 shows possible positions for attachment of an oscillation-reducing device on a turbine blade.

Turbine blade 50 has a blade root 52 and a connecting piece 54 having disposed thereon an upper shroud 58 for connection to an airfoil, the blade root 52 and the connecting piece 54 being connected together via a lower shroud 56. To reduce oscillations of turbine blade 50, one or more oscillation-reducing devices may be provided at different positions on turbine blade 50, each oscillation-reducing device having a housing with a cavity 14 and a body 16 disposed therein.

For example, in or on lower shroud 56, a respective oscillation-reducing device may be disposed at a position PO1 and/or at a position PO2. Additionally or alternatively, an oscillation-reducing device may be provided in connecting piece 54 at a position PO3. Additionally or alternatively, respective oscillation-reducing devices may be provided in or on upper shroud 58 at positions PO4, PO5 and/or PO6.

The effect and effectiveness of the oscillation reduction by impact contacts and momentum transfers using the oscillation-reducing device will be explained in more detail with reference to FIGS. 3 and 4, which show an experimentally confirmed behavior.

Figure 3A:
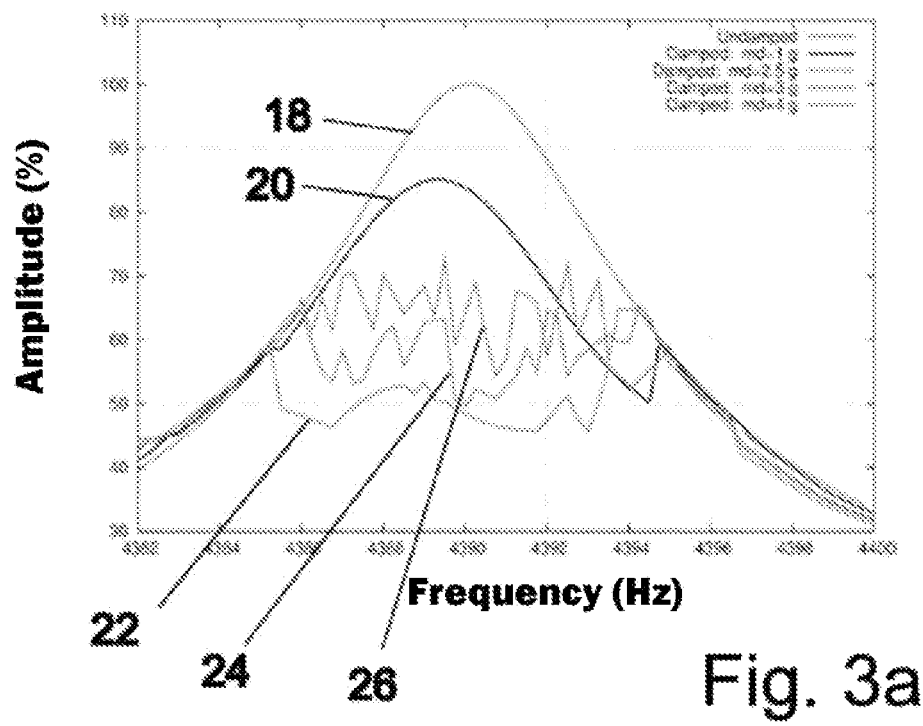
FIGS. 3a-b and FIGS. 4a-b show the effect and effectiveness of the oscillation reduction by an arrangement according to an aspect of the present disclosure.

FIG. 3a shows oscillation curves; i.e., amplitude-frequency curves, for an oscillatory structure without an oscillation-reducing device (curve 18), with an oscillation-reducing device having a body 16 with a mass of 1 g (curve 20), with an oscillation-reducing device having a body 16 with a mass of 2.5 g (curve 22), with an oscillation-reducing device having a body 16 with a mass of 3 g (curve 24), and with an oscillation-reducing device having a body 16 with a mass of 4 g (curve 26). In each of the curves 20-26, the clearance for movement B is 0.2 mm.

FIG. 3a shows that when impact contacts are made, in particular continuously, by bodies 16 having larger masses (curves 22, 24, 26), the oscillation amplitude of the mode can be significantly reduced compared to arrangements without impact contacts or with impact contacts of a body 16 having a smaller mass (curves 18, 20).

Figure 3B:
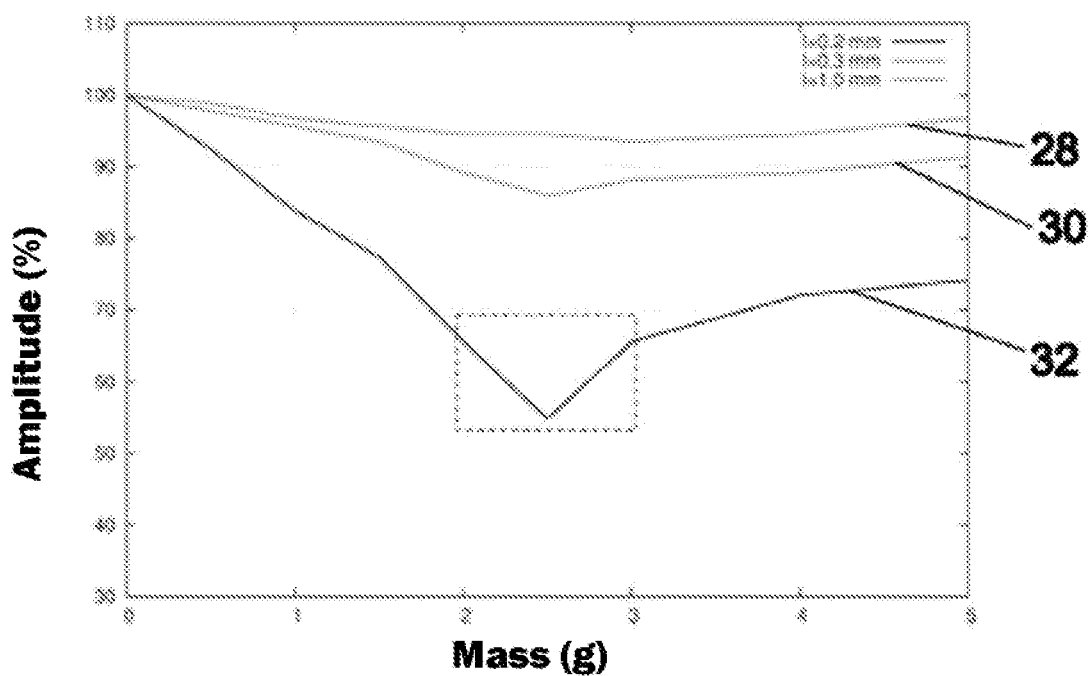

FIG. 3b shows, for the example of FIG. 3a, the dependence of the reduction in oscillation amplitude on the mass of body 16 for a clearance for movement of 1.0 mm (curve 28), 0.3 mm (curve 30), and 0.2 mm (curve 32), respectively.

Figure 4A:
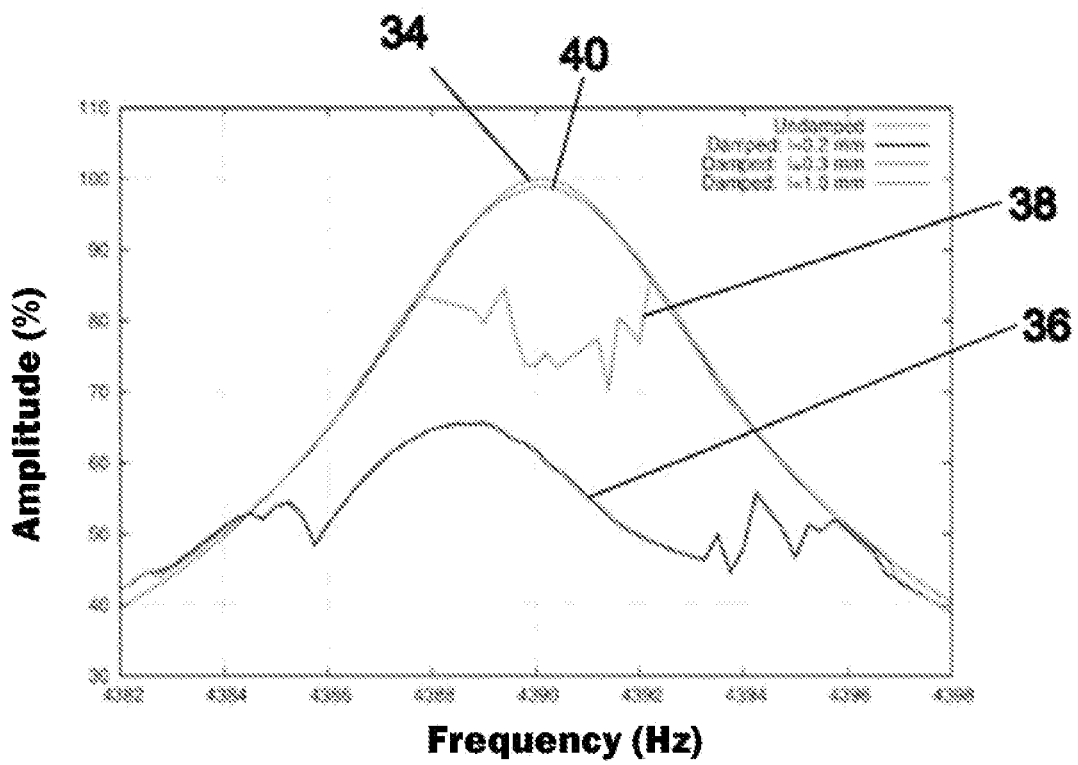

FIG. 4a shows oscillation curves for an oscillatory structure 12 without an oscillation-reducing device (curve 34) and for one with an oscillation-reducing device having a body 16 with a mass of 2 g and with a clearance for movement B of 0.2 mm (curve 36), 0.3 mm (curve 38), and 1.0 mm (curve 40), respectively.

Figure 4B:
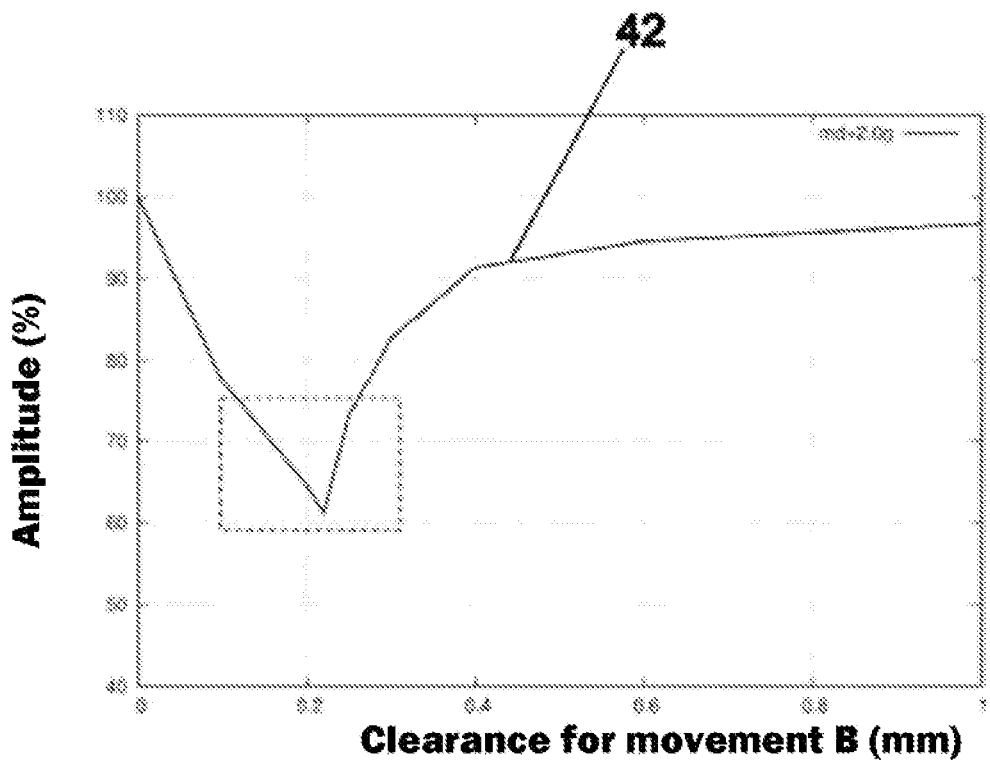

FIG. 4b shows, for the example of FIG. 4a, the dependence of the reduction in amplitude on the clearance for movement B of the body 16 with a mass of 2 g (curve 42).

In the examples of FIGS. 3 and 4, the impacts are substantially elastic and the energy dissipation by friction is low, in particular less than 5% per period of the kinetic energy of body 16 associated with the oscillation.

While exemplary embodiments have been presented in the foregoing detailed description, it should be appreciated that many modifications are possible. It should also be appreciated that the exemplary embodiments are only examples, and are not intended to limit the scope, applicability, or configuration in any way. Rather, the foregoing detailed description will provide those skilled in the art with a convenient road map for implementing at least one exemplary embodiment, it being understood that various changes may be made in the function and arrangement of elements described without departing from the scope of protection as set forth in the appended claims or derived from combinations of features equivalent thereto.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 arrangement for reducing oscillation
12 structure
14 cavity
16 body
18 amplitude-frequency curve without an oscillation-reducing device
20 amplitude-frequency curve with a body having a mass of 1 g
22 amplitude-frequency curve with a body having a mass of 2.5 g
24 amplitude-frequency curve with a body having a mass of 3 g
26 amplitude-frequency curve with a body having a mass of 4 g
28 amplitude-mass curve for a clearance for movement of 1.0 mm
30 amplitude-mass curve for a clearance for movement of 0.3 mm
32 amplitude-mass curve for a clearance for movement of 0.2 mm
34 amplitude-frequency curve without an oscillation-reducing device
36 amplitude-frequency curve with a body having a mass of 2 g and a clearance for movement of 0.2 mm
38 amplitude-frequency curve with a body having a mass of 2 g and a clearance for movement of 0.3 mm
40 amplitude-frequency curve with a body having a mass of 2 g and a clearance for movement of 1.0 mm
42 amplitude-clearance of movement curve with a body having a mass of 2 g
50 turbine blade
52 blade root
54 connecting piece
56 lower shroud
PO1 possible position of the oscillation-reducing device on a turbine blade
PO2 possible position of the oscillation-reducing device on a turbine blade
PO3 possible position of the oscillation-reducing device on a turbine blade
PO4 possible position of the oscillation-reducing device on a turbine blade
PO5 possible position of the oscillation-reducing device on a turbine blade
PO6 possible position of the oscillation-reducing device on a turbine blade

The invention claimed is:

1. An arrangement for reducing oscillation of an oscillatory structure, the arrangement comprising:
a structure having at least one mode in at least one direction; and
at least one oscillation-reducing device comprising at least one housing formed by or provided on the structure, a cavity, and at least one body configured for making impact contacts with the housing and disposed in the cavity in such a manner that the body is configured to make impact contacts with the housing at least temporarily for as long as the structure is excited in the at least one mode in the at least one direction, wherein:
a) for a clearance for movement B of the at least one body in the at least one direction in the cavity, it holds that:

$$0.1 \times A_{0j} < B < 0.95 \times A_{0j},$$

and/or
b) for a mass $m_i$ of the at least one body, it holds that:

$$m_i < \mu \times M_{jj}, \text{ with } \mu = \frac{a}{\left(\frac{A1j}{A0j}\right)^2},$$

and $0.000001 < a < 0.0009$,
where $A_{0j}$ is an oscillation amplitude in the at least one mode without an oscillation-reducing device at a position at which the oscillation-reducing device is to be provided, during normal intended use of the structure,
where Mjj is a modal mass of the structure in the at least one mode, and
where $A_{1j}$ is a maximum oscillation amplitude in the at least one mode during the normal intended use of the structure with the oscillation-reducing device at the position at which the oscillation-reducing device is to be provided.

2. The arrangement as recited in claim 1 wherein, by providing the oscillation-reducing device, the maximum oscillation amplitude in the at least one mode is reduced by at least 5%, 20%, 30%, 40% or 50% compared to the oscillation amplitude in the at least one mode without the oscillation-reducing device at the position at which the oscillation-reducing device is to be provided, during the normal intended use of the structure.

3. The arrangement as recited in claim 1, wherein the structure is a rotor blade or a stator vane of a turbine or compressor stage of a turbomachine, a part or a portion of the turbomachine, a part or a portion of a motor, of a turbine, of a manufacturing machine, of an engine, of a propulsion system, of a construction, of a vehicle, of an aircraft, of a rocket, of a satellite, a part in contact therewith, or a portion in contact therewith.

4. The arrangement as recited in claim 1, wherein a total mass of the at least one body is at least 100 times smaller than the structure's modal mass that oscillates in the respective mode and/or the modal mass oscillating in the respective mode is no more than 200000 times greater than the total mass of the at least one body.

5. The arrangement as recited in claim 1, wherein the at least one oscillation-reducing device is disposed on the structure only in those regions where the oscillation amplitude in the at least one mode without the oscillation-reducing device in the respective region is at least 0.1% and/or no more than 100% of the maximum oscillation amplitude in the at least one mode without the oscillation-reducing device in the respective region.

6. The arrangement as recited in claim 1, wherein the body comprises or is an ellipsoid, a sphere, a cylinder, or a cuboid.

7. The arrangement as recited in claim 1, wherein a clearance for movement of the body in at least one direction is no more than 2 times a maximum cross-sectional dimension of the body and/or at least 0.05 times the maximum cross-sectional dimension of the body.

8. The arrangement as recited in claim 1, wherein the structure is a turbine blade having a blade root, a connecting piece for connection to an airfoil, an upper shroud disposed on the connecting piece, and a lower shroud connecting the blade root and the connecting piece, and wherein the oscillation-reducing device is provided in or on the lower shroud and/or in or on the upper shroud and/or in or on the connecting piece.

9. The arrangement as recited in claim 1, wherein the at least one body has a metallic or ceramic surface, and the cavity is bounded by metallic or ceramic surfaces, so that the impact contacts occur between metal and metal, between ceramic and ceramic, or between metal and ceramic.

10. The arrangement as recited in claim 1, wherein the cavity is a closed cavity, and wherein the at least one body is configured to make impact contacts with the housing continuously for as long as the structure is excited in the at least one mode in the at least one direction.

11. The arrangement as recited in claim 1, wherein the oscillation-reducing device comprises a plurality of bodies comprising the at least one body, wherein a total mass of all bodies of the oscillation-reducing device is at least 100 times, or at least 1000 times, or at least 10000 times smaller than the structure's modal mass that oscillates in the respective mode or the modal mass oscillating in the respective mode is no more than 200000 times, no more than 100000 times, or no more than 50000 times greater than the total mass of the all of the bodies.

12. The arrangement as recited in claim 1, wherein the oscillation-reducing device comprises a plurality of bodies comprising the at least one body, wherein a clearance for movement of all of the bodies in all directions is no more than 2 times a maximum cross-sectional dimension of the bodies and/or at least 0.05 times the maximum cross-sectional dimension of the bodies.

* * * * *